United States Patent [19]
Mossi et al.

[11] Patent Number: 6,032,979
[45] Date of Patent: Mar. 7, 2000

[54] ADAPTIVE OUTPUT INFLATOR

[75] Inventors: G. Dean Mossi, Roy; Kim V. Dahl, Clinton, both of Utah

[73] Assignee: Autoliv ASP, Inc., Ogden, Utah

[21] Appl. No.: 09/027,114

[22] Filed: Feb. 18, 1998

[51] Int. Cl.[7] .................................................. B60R 21/26
[52] U.S. Cl. .......................... 280/741; 280/736; 280/742
[58] Field of Search ................................... 280/741, 731, 280/735, 736, 742, 734

[56] References Cited

U.S. PATENT DOCUMENTS

| | | |
|---|---|---|
| 5,346,254 | 9/1994 | Esterberg . |
| 5,431,103 | 7/1995 | Hock et al. . |
| 5,564,743 | 10/1996 | Marchant ................................. 280/737 |
| 5,582,426 | 12/1996 | Buchanan et al. . |
| 5,613,702 | 3/1997 | Goetz . |
| 5,622,380 | 4/1997 | Khandhadia et al. . |
| 5,628,528 | 5/1997 | DeSautelle et al. . |
| 5,630,618 | 5/1997 | Buchanan et al. . |
| 5,658,010 | 8/1997 | Steffens, Jr. et al. . |
| 5,690,357 | 11/1997 | Cuevas . |

*Primary Examiner*—Eric Culbreth
*Attorney, Agent, or Firm*—Sally J. Brown

[57] ABSTRACT

An airbag inflator which can supply airbag inflation gas in an adaptive output is provided. The subject inflator includes two discrete isolated chambers of gas generant materials and permits several distinct inflation performance scenarios while desirably employing a single set of inflation gas treatment components such as filters for the treatment of products of both chambers.

19 Claims, 3 Drawing Sheets

ADAPTIVE OUTPUT INFLATOR

BACKGROUND OF THE INVENTION

This invention relates generally to inflators for use in inflating inflatable restraint airbag cushions, such as used to provide impact protection to occupants of motor vehicles. More particularly, the invention relates to inflators having multiple or plural stages or levels of inflation gas output and as such may be used to provide an inflation gas output which is adaptive to factors such as one or more crash and occupant conditions.

It is well known to protect a vehicle occupant using a cushion or bag, e.g., an "airbag," that is inflated or expanded with gas when the vehicle encounters sudden deceleration, such as in a collision. In such systems, the airbag cushion is to normally housed in an uninflated and folded condition to minimize space requirements. Upon actuation of the system, the cushion begins being inflated in a matter of no more than a few milliseconds with gas produced or supplied by a device commonly referred to as "an inflator."

Various types of inflator devices have been disclosed in the art for the inflation of an airbag such as used in inflatable restraint systems. One type of known inflator device derives inflation gas from a combustible pyrotechnic gas generating material which, upon ignition, generates a quantity of gas sufficient to inflate the airbag.

Such inflator devices commonly include or incorporate various component parts including: a pressure vessel wherein the pyrotechnic gas generating material is burned; various filter or inflation medium treatment devices to properly condition the inflation medium prior to passage into the associated airbag cushion and a diffluser to assist in the proper directing of the inflation medium into the associated airbag cushion.

In view of possibly varying operating conditions and, in turn, possibly varying desired performance characteristics, there is a need and a desire to provide what has been termed an "adaptive" inflator device and corresponding inflatable restraint system. With an adaptive inflator device, output parameters such as the quantity, supply, and rate of supply of inflation gas, for example, can be selectively and appropriately varied dependent on selected operating conditions such as ambient temperature, occupant presence, seat belt usage and rate of deceleration of the motor vehicle, for example.

While such adaptive systems are desirable, they typically require the inclusion of additional components as a part of the associated inflator device, thus undesirably increasing one or more of the size, cost and weight of the inflator device. For example, various proposed or currently available dual stage inflator devices appear based on the principal of packaging together two separate inflators. As a result, such inflator combinations commonly include two distinct pressure vessels, two sets of filter or inflation gas treatment components, one for the output of each of the pressure vessels, and two distinct diffusers, again one for the output of each of the pressure vessels. Thus, it has been difficult to provide an adaptive inflator which will satisfactorily meet the size, cost and weight limitations associated with modem vehicle design, particularly as it pertains to driver side applications.

Thus, there remains a need for an adaptive inflator device of simple design and construction and which will meet the size requirements for vehicles, especially for driver side applications.

SUMMARY OF THE INVENTION

A general object of the invention is to provide an improved inflator, inflatable restraint system and associated or corresponding methods of operation.

A more specific objective of the invention is to overcome one or more to of the problems described above.

The general object of the invention can be attained, at least in part, through an airbag inflator which includes a housing that defines a first chamber which in an at rest state contains a quantity of a first gas generant material ignitable to produce first combustion products. The first chamber also contains a second chamber which in an at rest state contains a quantity of a second gas generant material ignitable to produce second combustion products. The second chamber includes an exit orifice adapted to open to place the second combustion products in fluid communication with the contents of the first chamber. The airbag inflator also includes a first igniter device operatively associated with the first chamber and a second igniter device operatively associated with the second chamber.

The prior art fails to provide an as simple as desired design for an inflator adapted to provide multiple levels of output performance. More particularly, the prior art fails to provide an adaptive output inflator and associated inflatable restraint system, particularly an inflator for a driver side inflatable restraint system installation, wherein the inflator utilizes a common set of components such as a pressure vessel, filter, and associated seals for each of two or more operating stages and can thus avoid the need for the inclusion of separate such components for each such inflator stage.

The invention further comprehends an adaptive pyrotechnic airbag inflator. The inflator includes first and second chambers, an insulator, and first and second igniter devices. More specifically, the first and second chambers of inflator each contain a quantity of pyrotechnic material ignitable to produce combustion products. The second chamber includes an exit orifice adapted to open whereby combustion products produced by combustion of pyrotechnic material contained in the second chamber are placed in fluid conununication with the contents of the first chamber. The exit opening is normally closed to prevent passage of material into the second chamber. The insulator is disposed about the second chamber effective to avoid autoignition of the pyrotechnic material contained within the second chamber upon thermal contact therewith by the combustion products formed upon ignition of the pyrotechnic material contained within the first chamber. The first igniter device is operatively associated with the first chamber and the second igniter device is operatively associated with the second chamber.

The invention still fuirther comprehends a method of operating an airbag inflator. The inflator includes a housing defining a first chamber which in an at rest state contains a quantity of a first gas generant material ignitable to produce first combustion products. The first chamber also contains a second chamber which in an at rest state contains a quantity of a second gas generant material ignitable to produce second combustion products. The second chamber includes an exit orifice adapted to open to place the second combustion products in fluid communication with the contents of the first chamber. The inflator further includes a first igniter device operatively associated with the first chamber and a second igniter device operatively associated with the second chamber. The method of the invention includes the step of actuating at least one of the first and second igniter devices.

As used herein, references to the detection or sensing of "occupant presence" are to be understood to refer to and include detection and sensing of size, weight, and/or positions of the particular occupant under consideration.

References to inflator or inflation gas "output" are to be understood to refer to inflator performance output parameters such as the quantity, supply, and rate of supply of inflation gas. With "adaptive output inflators," the inflator output is generally dependent on selected operating conditions such as ambient temperature, occupant presence, seat belt usage and rate of deceleration of the motor vehicle, for example.

Other objects and advantages will be apparent to those skilled in the art from the following detailed description taken in conjunction with the appended claims and drawings.

DETAILED DESCRIPTION OF THE INVENTION

Figure 1:
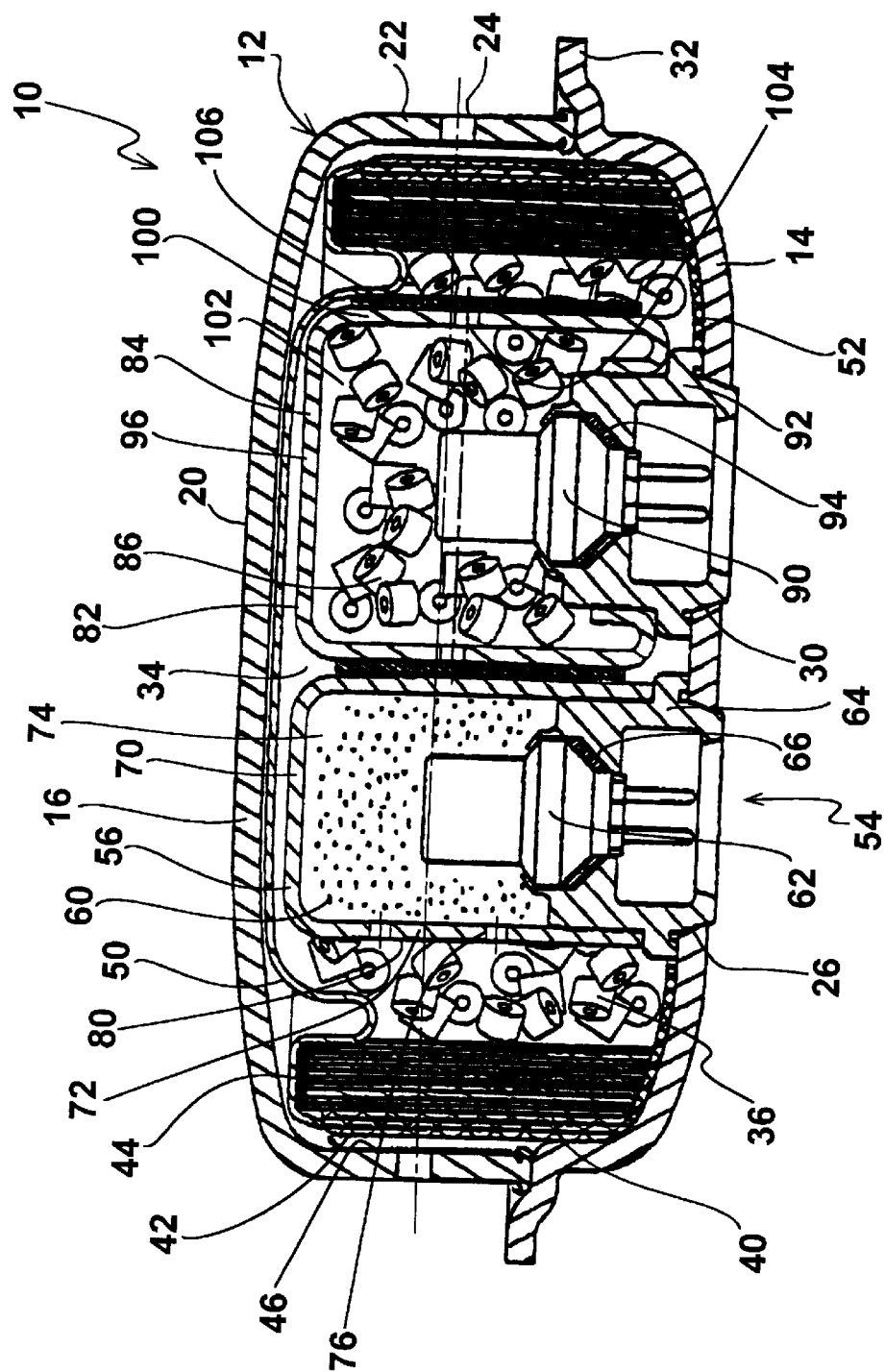
FIG. 1 is a partial cross-sectional side view of an airbag inflator in accordance with one embodiment of the invention.
Figure 2:
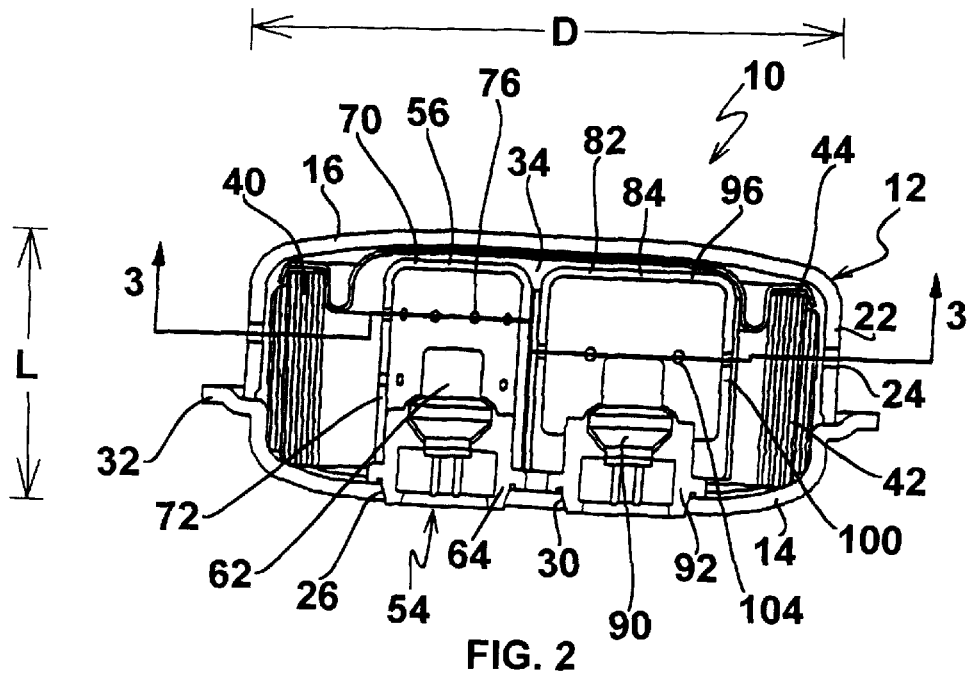
FIG. 2 is a partial cross-sectional side view of the airbag inflator of FIG. 1 but now simplified by not showing gas generant, igniter materials and certain seals, for example.
Figure 3:
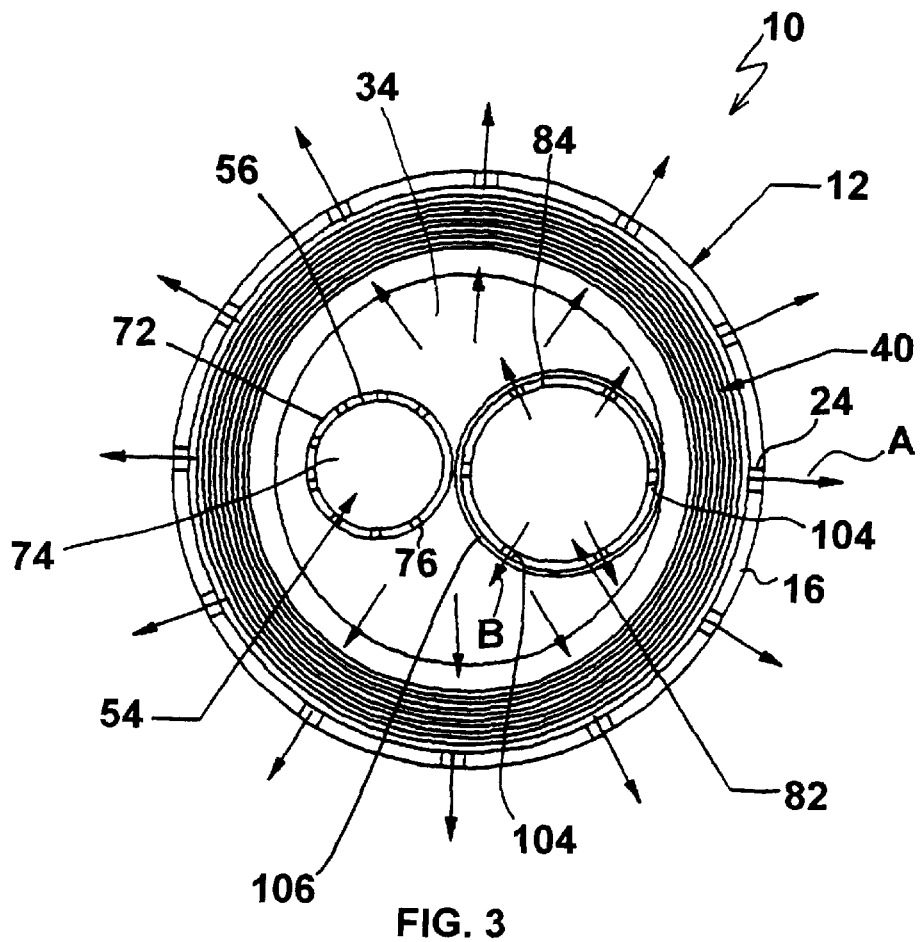
FIG. 3 is a view of the airbag inflator illustrated in FIG. 2 taken substantially along the line 3—3 of FIG. 2 and viewed in the direction of the arrows.

FIGS. 1 and 2 illustrate an adaptive output driver side inflator assembly in accordance with one embodiment of the invention and generally designated with the reference numeral 10. While the invention will be described hereinafter with particular reference to a driver side airbag inflatable restraint system installation, it will be understood that the invention has general applicability to other types or kinds of airbag assemblies including, for example, passenger side, and side impact airbag assemblies such as for automotive vehicles including vans, pick-up trucks, and particularly automobiles.

The inflator assembly 10 has a generally cylindrical external outline and includes a housing construction 12 such as formed of two structural components, i.e., a lower shell or base portion 14 and an upper shell or diffuser cap portion 16, such as may desirably be made of aluminum and appropriately joined or fastened together such as by application of an inertia welding operation. The housing 12 is illustrated in the general form of a flattened, disk-shaped circular cylinder typically or generally having a length (denominated "L") to diameter (denominated "D") ratio of about 0.5 or less. It will be appreciated that such a sized and shaped housing may most conveniently correspond to the shape of the vehicle steering wheel and can therefore facilitate assembly in an aesthetically pleasing manner.

The diffuser cap portion 16 is in the general form of an inverted bowl and includes a top wall 20 and a cylindrical sidewall 22. The sidewall 22 includes a plurality of spaced, preferably, generally uniformly spaced gas exit ports 24.

The base portion 14 includes first and second mounting openings, designated by the reference numerals 26 and 30, respectively, the use of which will be discussed in greater detail below. The base portion 14 also includes a peripheral bracket 32 that extends radially outward from the housing 12 and serves to form an interface attachment which is used to attach the inflator assembly 10 to a vehicle the occupants of which are to be protected from injury tending to result from the impact of a collision.

The housing 12 is configured to define a central, generally cylindrical first chamber 34. The first chamber 34 contains or houses a supply of a first gas generant material 36, typically in the form of a pyrotechnic, such as known for use in airbag inflators, such as composed of a transition metal amine nitrate with oxidizer and binder, for example. Surrounding the first gas generant material 36 is a filter assembly 40 such as a combustion screen or filter 42 such as formed of multiple layers or wraps of metal screen and a filter damper pad 44. Surrounding the filter 42 and generally adjacent the inner surface of the sidewall 22 is an adhesive-backed foil seal 46 which preferably hermetically seals the gas generant material 36 within the inflator 10, thereby protecting the gas generant material from ambient conditions, including moisture. The inflator assembly 10 also includes a retainer 50 and an annular base damper pad 52 serving as construction expedients retaining the inflator assembly components in proper relative arrangement and preventing undesired flow passage through the assembly.

A first igniter assembly, generally designated by the reference numeral 54, is mounted to the housing 12 in a location within the first chamber 34 via the first mounting opening 26. The first igniter assembly 54 may take the form of a known pyrotechnic initiator device such as, as are known in the art, an igniter cup 56 wherein is housed an igniter material 60, a first igniter device or squib 62, a squib adapter or holder 64 whereby the igniter assembly 54 is mounted to or is mated with the housing 12 and a squib seal 66, sealing the squib 62 with the adapter 64. As shown, the igniter cup 56 can take the form of a generally concave member with a cap 70 and a cylindrical sidewall 72 forming an interior 74. The igniter cup 56 can be formed of a gas-impermeable material, such as metal, with the cylindrical sidewall 72 including a plurality of spaced, preferably, generally uniformly spaced gas exit orifices 76. The gas exit orifices 76 are normally (e.g., when the inflator is in a pre-actuation state) covered and the passage of material therethrough prevented by means of a pressure sensitive covering or barrier 80, such as by means of an adhesive-backed foil seal wrap or the like as is well known in the art. As is known, the covering 80 can be selected to open or rupture upon the application of a pre-determined pressure thereagainst from the interior of the igniter cup 56.

When actuated, ignition of the igniter material 60 customarily results in an increase in pressure within the cup interior 74 with the subsequent predetermined rupturing or opening of the covering 80 to permit passage of ignition products produced by the combustion of the igniter material 60 through the exit orifices 76, from the igniter assembly 54 to the gas generant material 36 contained within the first chamber 34. The resulting contact by or between the ignition products and the gas generant material results in the ignition and reaction of the gas generant material, with gases so produced passing through the filter 42, rupturing the foil seal 46 and passing through the gas exit ports 24 (as signified by the arrows A) and out from the inflator assembly 10 into an associated airbag cushion (not shown). As will be appreciated, the contact of ignition products with the gas generant material can appropriately be, either or both, thermal or physical in nature.

In practice, the igniter assembly 54 can be formed by placing the igniter cup 56 containing the igniter material 60 over the igniter device 62 and the holder 64 and placed at the mounting opening 26. The igniter assembly 54 may then be joined to the housing 12 such as by welding the holder 64 to the base portion 14 at the mounting opening 26.

The first chamber 34 also houses or contains a second chamber 82. The second chamber 82 includes a generant cup 84 wherein is housed a gas generant material, herein designated as the second gas generant material 86, a second igniter device or squib 90, a second squib adapter 92 whereby the second chamber 82 is mounted to or mates with the housing 12 and a second squib seal 94, sealing the squib 90 with the adapter 92. As shown, the generant cup 84 can take the form of a generally concave member with a cap 96 and a cylindrical sidewall 100 forming an interior 102.

The second gas generant material 86 is typically in the form of a pyrotechnic material and may either be the same or different in composition, shape, size or form, as compared to the first gas generant material 36. The generant cup 84 can be formed of a gas-impermeable material, such as metal, with the cylindrical sidewall 100 including a plurality of spaced, preferably, generally uniformly spaced gas exit orifices 104.

The exterior side of the cylindrical sidewall 100 is covered or wrap with a pressure sensitive insulator barrier material 106. Desirably, such an insulator barrier material 106 can serve one or more of several functions. First, the insulator barrier material 106 can serve to insulate the second chamber 82 and the contents thereof, e.g., the second gas generant material 86, from at least some of the effects of actuation of the first igniter assembly 54 and combustion of the first gas generant material 36 contained within the first chamber 34. As will be appreciated, actuation of the first igniter assembly 54 and reaction of the first gas generant material 36 will generally result in or produce an increase in temperature.

As described above, the second chamber 82 is housed or contained within the first chamber 34 and, in order to minimize space requirements, it is generally preferable that the second chamber 82 be in close proximity with the igniter assembly 54. Thus, the inclusion of the insulator barrier material 106 can serve to minimize or avoid the undesired and possibly detrimental impact of such temperature increase with respect to the second chamber 82 such as by preventing or avoiding the second chamber 82 from reaching or achieving the autoignition temperature of the gas generant material stored or housed therewithin as a result of contact with the reaction products of the first chamber 34.

Further, the insulator barrier material 106 can serve to normally (e.g., when the inflator 10 is in a pre-actuation state) cover the gas exit orifices 104 and prevent the passage of material therethrough. The insulator barrier material 106 will generally be selected to open or rupture upon the application of a pre-determined pressure thereagainst from the inside of the second chamber 82.

As will be appreciated, the insulator barrier material can take various forms such as fiberglass-containing adhesive-backed foil tape. Further, it will be appreciated that if desired separate materials can be used to fulfill, supply or provide the various functions of such an insulator barrier material. For example, the invention can be practiced with an insulator barrier material composed of one or more materials for insulating properties or benefits and an additional one or more materials to effect normal closure or coverage of the gas exit orifices.

It will be appreciated that an inflator assembly in accordance with the invention can provide operation performance in accordance with selected operating conditions as may be required or desired for particular inflatable restraint system installations and applications. More specifically, an inflator assembly of the invention can be actuated in a manner such that either or both the quantity or rate of inflation gas production can be appropriately varied, such as at the time of a vehicle crash or collision incident, to take into account one or more conditions of occupant presence, as described above. Such inflator performance adaptability results from the subject inflator having two discrete and ballistically isolated chambers of gas generant materials. The subject inflator permits several distinct inflation performance scenarios:

For example, such an inflator assembly can be operated to have a first stage discharge whereby the first igniter charge 60 is ignited to produce combustion products which are passed to the first gas generant chamber 34 to ignite the first gas generant material 36, such as described above, to produce inflation gas at a first output level without actuating or firing the second igniter device 90 or reacting or activating the gas generant material 86 contained in the second chamber 82. As will be appreciated, such operation may be desired to provide a minimized or reduced to inflator output such as may be desired in an instance of a low speed collision, for example.

Alternatively, an inflator assembly in accordance with the invention can be operated such that both the first and second igniter devices, 62 and 90, respectively, are actuated.

As will be appreciated, such operation and ignition of both the first and second igniter devices and first and second gas generant materials can involve the simultaneous or near simultaneous actuation and firing of the first and second igniter devices (such as may be desired in order to provide a very rapid inflation and deployment of an associated airbag cushion, as may be desired in response to a high speed or severe vehicle collision) or the sequential actuation and firing of the first and second igniter devices (such as may be desired upon the occurrence of a moderately severe vehicle collision). Further, with such sequential actuation and firing, the time lag or delay between the actuation and firing of the first and second squibs and, in turn, the ignition of the first and second gas generant materials can be tailored to meet the specific requirements for a particular inflatable restraint system installation, as will be appreciated by those skilled in the art. Thus, such inflator assemblies are particularly suited for application as adaptive output inflators such as can be made generally dependent on one or more selected operating conditions such as ambient temperature, occupant presence, seat belt usage and rate of deceleration of the motor vehicle, for example.

With actuation of the igniter device 90, the igniter device 90 releases ignition products which ignite the gas generant 86 to produce reaction products which result in an increase in pressure within the cup interior 102 with the subsequent predetermined rupturing or opening of the insulator barrier material 106 to permit passage of the reaction products through the exit orifices 104 (as signified by the arrows B) and subsequently out through the gas exit ports 24 from the inflator assembly 10 into the associated airbag cushion (not shown).

The inflator assembly 10, rather than relying on separate filter assemblies for each chamber or stage of the inflator, as is common with various prior art dual stage inflator devices, employs or utilizes a single filter assembly 40 for the filtration or treatment, e.g., cooling, of the inflation products produced from both the first and second chambers. Further, such use of a single filter assembly rather the use of two or more filter assemblies can serve to reduce or eliminate the need for the inclusion of multiple filter assembly seals. Still further, the inflator assembly 10 includes a single diffuser rather than requiring separate diffusers for each chamber or stage contained therein.

As will be appreciated, reductions in the number of parts in an inflator assembly can simplify inflator design, reduce manufacturing and production costs, reduce assembly weight and result in an assembly requiring a smaller volume of space within a vehicle. For example, the use of a single filter or filter assembly for the filtration of the inflation products of the inflation discharge of both the first and second chambers can simplify system design and result in better utilization of space within the inflator assembly. Such use facilitates the design of an adaptive inflator assembly to be generally housed within the envelope typically or usually sized and provided for system installations, particularly for driver side inflatable restraint systems, such as sized to be housed within or at a steering wheel column or hub.

The invention in its broader application is not limited to the use of particular or specific gas generants. As those skilled in the art will appreciate, the invention can be practiced using a wide variety of gas generant materials which meet flame temperature, stability, filterability, toxicity, corrosivity, and gas generation requirements. The invention is believed to be particularly suited for practice in conjunction with the use of pyrotechnic gas generant materials, as is known in the art including, for example, a pyrotechnic composed of a transition metal amine nitrate with oxidizer and binder, as is known in the art.

As will be appreciated, gas generant materials, e.g., pyrotechnics, useful in the practice of the invention can take various appropriate desired forms, including, for example, various extruded forms as well as granulated materials. The invention, in its broader practice, is not limited to particular or specific forms of gas generant materials.

Further, it is to be appreciated that while an inflator assembly in accordance with the invention may utilize a gas generant material of the same composition and physical form or parameters as both the first and second gas generant materials, the broader practice of the invention is not so limited. For example, it specifically may be desired that the first gas generant material be relatively slow burning so as to result in or provide a slower or gentler onset of inflation of the associated airbag cushion and that the second gas generant material be relatively quick burning to provide a quicker or faster inflation rate for the associated airbag and such as may be desired in the occurrence of the associated vehicle being involved in a relatively severe collision or crash. Such difference in performance can be realized through the use of gas generant materials of different composition as the first and second gas generant materials. Alternatively or additionally, the first and second gas generant materials can be in different physical form or have different physical parameters, e.g., shape and size. For example, to provide a faster or more rapid burning material it may be desirable to employ a form of the material having an increased or greater surface area.

The present invention is described in further detail in connection with the following example which illustrates or simulates various aspects involved in the practice of the invention. It is to be understood that all changes that come within the spirit of the invention are desired to be protected and thus the invention is not to be construed as limited by this example.

EXAMPLE

Operation of the subject adaptive output inflator was experimentally verified using a steel housing airbag inflator assembly generally similar to the inflator assembly 10, described above. The test inflator was of a height of 36.4 mm and a diameter of 80 mm. The first chamber contained 43 grams and the second chamber contained 6 grams of a pyrotechnic gas generant material composed of transition metal amine nitrate with oxidizer and binder in the form of a plurality of annular shaped cylinders called "extrudlets." That is, an extrudlet has the form of a cylinder with a hole longitudinally extending therethrough. The pyrotechnic gas generant material extrudlets used in the example had a length and diameter of 0.125 inch and inside diameter of 0.042 inch. The igniter cup of the first chamber contained 2.6 grams of granulated igniter material.

The test inflator apparatus included a steel mesh filter. The gas which evolved from the pyrotechnic was passed through the filter and out from the inflator assembly through the gas exit ports radially located about the inflator in the diffuser portion sidewall.

The test inflator was attached to a 60 liter closed tank, which was also equipped a pressure transducer to measure changes in tank gas pressure produced by the inflator. The portion of the inflator that vents the evolving gas was wholly contained within the tank so that the volume of the tank was complete closed off from the outside atmosphere. An electronic firing line was connected to each of the squibs of the test inflator so that the different compartments of the test inflator could be appropriately fired either separately, simultaneously or with a selected time delay between the firing of each.

Figure 4:
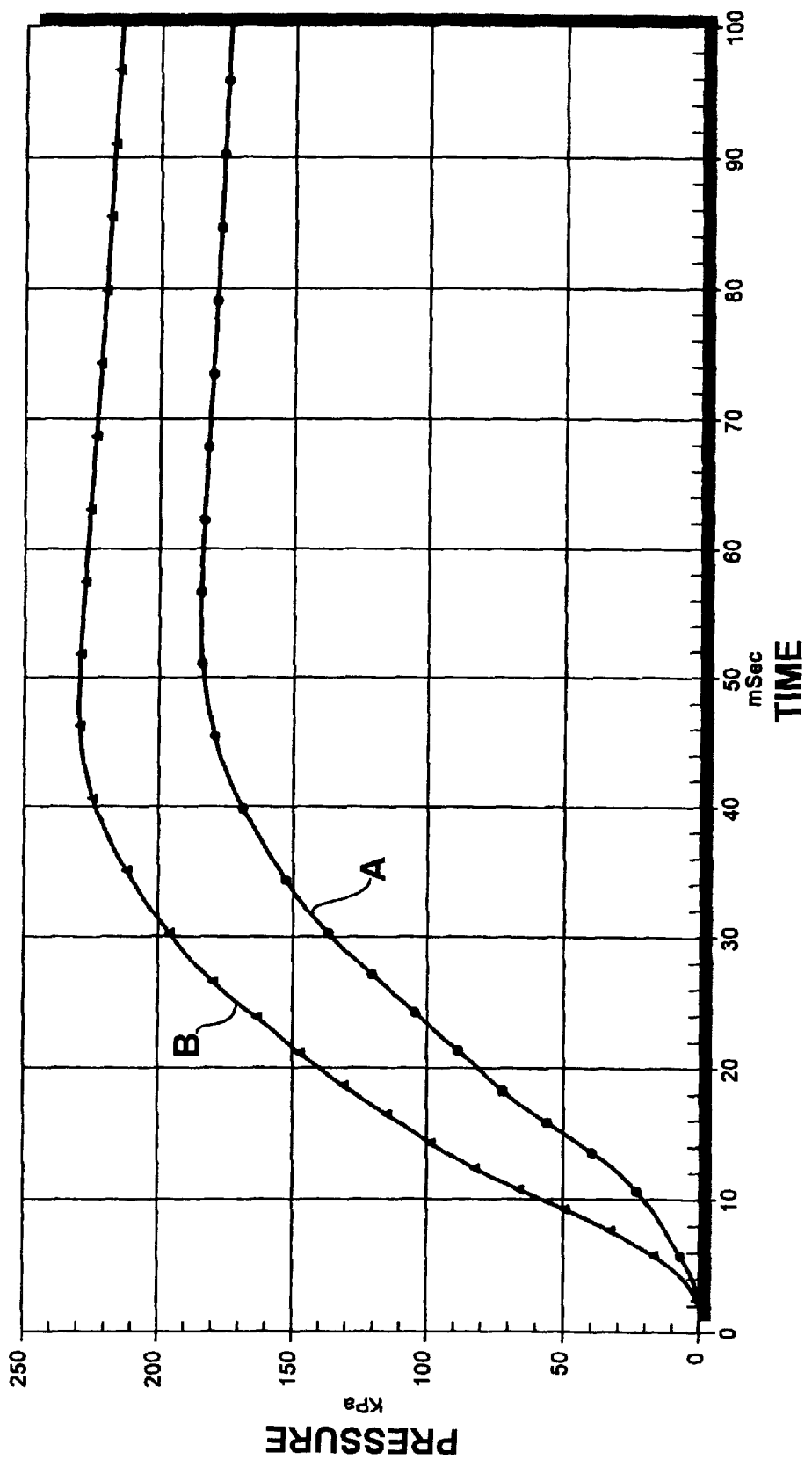
FIG. 4 is a graphical depiction of tank pressure as a function of time performance realized for the inflator assembly utilized in the Example.

The test inflator was operated in a manner in which: A) only the first chamber was fired and B) both the first and second chambers were fired substantially simultaneously and the tank pressure as a function of time performance realized for by the test inflator assembly are shown in FIG. 4. The line A corresponds to the results obtained when only the first chamber was fired, while the line B corresponds to the results obtained when both the first and second chambers were fired substantially simultaneously.

In the Example, the simultaneous firing of both the first and second chambers resulted in both a more rapid increase in pressure within the closed tank and also a higher maximum tank pressure, as compared to operation wherein only the first chamber was fired. As will be appreciated, the gentler or more gradual onset of airbag cushion deployment, as realized when only the first chamber was fired, may be better suited for particular deployment situations such as a relatively low severity collision or in connection with the protection of occupants of smaller size. In contrast, the rapid pressure increase realized with the simultaneous firing of both chambers may be better suited for alternative applications such as a high speed collision in which the occupant is seated in the proper position to be properly cushioned by the airbag, for example.

As will be appreciated, both the rise rate and maximum pressure realized by the firing of the one or both of the chambers of the inflator can be selected or varied such as by appropriately altering the amount, size, shape and type of pyrotechnic material contained in the fired chamber(s) as well by selectively altering other design parameters. Further, the pressure versus time performance for the inflator can be tuned to the requirements or needs for a particular airbag system installation to appropriately reduce occupant injury and optimize occupant protection.

The invention illustratively disclosed herein suitably may be practiced in the absence of any element, part, step, component, or ingredient which is not specifically disclosed herein.

Thus, the invention provides an inflator adapted to provide multiple levels of output performance and which inflator is of a significantly simpler design than inflators previously available. In accordance with at least one embodiment of the invention, an adaptive output inflator particularly for application as an inflator for a driver side inflatable restraint system installation is provided which utilizes a common set of components such as a pressure vessel, filter, and associated seals for each of two or more operating stages and can thus avoid the need for the inclusion of separate such components for each such inflator stage. Thus, the invention simplifies system design and results in better utilization of space within an inflator assembly. Consequently, the invention facilitates the design of an adaptive inflator assembly to be generally housed within the envelope typically or usually sized and provided for system installations, particularly for driver side inflatable restraint systems, such as sized to be housed within or at a steering wheel column or hub.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An airbag inflator comprising:
   a housing defining a first chamber which in an at rest state contains a quantity of a first gas generant material ignitable to produce first combustion products including a first inflation gas, said first chamber having a plurality of spaced apart gas exit ports adapted to open to permit passage of the first inflation gas from said airbag inflator, said first chamber also containing a second chamber which in an at rest state contains a quantity of a second gas generant material ignitable to produce second combustion products, said second chamber including an exit orifice adapted to open to place the second combustion products in fluid communication with contents of the first chamber;
   a first igniter device operatively associated with the first chamber; and
   a second igniter device operatively associated with the second chamber.

2. The airbag inflator of claim 1 wherein the first gas generant material is a pyrotechnic material.

3. The airbag inflator of claim 2 wherein the second gas generant material is a pyrotechnic material.

4. The airbag inflator of claim 1 wherein the second gas generant material is a pyrotechnic material.

5. The airbag inflator of claim 1 having a form of a flattened, disk-shaped circular cylinder shaped and sized for driver side placement within a vehicle steering wheel.

6. The airbag inflator of claim 1 additionally comprising a single filter assembly for the filtration of inflation products of the first and second chambers.

7. The airbag inflator of claim 1 additionally comprising an insulator about the second chamber effective to avoid autoignition of the second gas generant material contained within the second chamber upon thermal contact therewith by the combustion products formed upon ignition of the first gas generant material contained within the first chamber.

8. The airbag inflator of claim 1 wherein the first and second gas generant materials differ in one or more of the following aspects: composition, shape, and size.

9. An adaptive pyrotechnic airbag inflator comprising:
   a housing defining a first chamber which in an at rest state contains a quantity of a first pyrotechnic material ignitable to produce first combustion products including a first inflation gas, said first chamber having a plurality of spaced apart gas exit ports adapted to open to permit passage of the first inflation gas from said airbag inflator, said first chamber also containing a second chamber which in an at rest state contains a quantity of a second pyrotechnic material ignitable to produce second combustion products including a second inflation gas, with the second chamber including an exit orifice adapted to open whereby combustion products produced by combustion of pyrotechnic material contained in the second chamber are placed in fluid communication with contents of the first chamber, wherein said exit orifice is normally closed to prevent passage of material into the second chamber;
   said housing also containing a filter assembly adjacent the plurality of spaced apart gas exit ports, the filter assembly permitting filtration of inflation products of both the first and second chambers;
   an insulator about the second chamber effective to avoid autoignition of the pyrotechnic material contained within the second chamber upon thermal contact therewith by the combustion products formed upon combustion of the pyrotechnic material contained within the first chamber;
   a first igniter device operatively associated with the first chamber; and
   a second igniter device operatively associated with the second chamber.

10. The airbag inflator of claim 9 having a form of a flattened, disk-shaped circular cylinder shaped and sized for driver side placement within a vehicle steering wheel.

11. The airbag inflator of claim 9 wherein the pyrotechnic material contained in each of the first and second chambers is of the same composition.

12. The airbag inflator of claim 9 wherein the pyrotechnic material contained in each of the first and second chambers is of different composition.

13. The airbag inflator of claim 9 wherein the first igniter device is independently operable from the second igniter device.

14. A method of generating inflation gas via an airbag inflator which includes:
   a housing defining a first chamber which in an at rest state contains a quantity of a first gas generant material ignitable to produce first combustion products including a first inflation gas, said first chamber having a plurality of spaced apart gas exit ports adapted to open to permit passage of the first inflation gas from said airbag inflator, said first chamber also containing a second chamber which in an at rest state contains a quantity of a second gas generant material ignitable to produce second combustion products including a second inflation gas, said second chamber including an exit orifice adapted to open to place the second combustion products in fluid communication with the contents of the first chamber;
   a first igniter device operatively associated with the first chamber; and
   a second igniter device operatively associated with the second chamber;
   said method comprising the step of actuating at least one of the first and second igniter devices.

15. The method of claim 14 wherein both the first and second igniter devices are actuated.

16. The method of claim 15 wherein the first and second igniter devices are actuated substantially simultaneously.

17. The method of claim 15 wherein the second igniter device is actuated at a selected time interval subsequent to actuation of the first igniter device.

18. The method of claim 15 wherein following said actuating of said first igniter device, the first gas generant material reacts to produce first combustion products including the first inflation gas and wherein following said actuating of said second igniter device, the second gas generant material reacts to produce second combustion products including the second inflation gas, said method additionally comprising:

filtering both the first and second inflation gases through a single filter assembly in the housing.

19. The method of claim 15 wherein only the first igniter device is actuated.

* * * * *

US006032979B1

(12) REEXAMINATION CERTIFICATE (4467th)
United States Patent
Mossi et al.

(10) Number: US 6,032,979 C1
(45) Certificate Issued: Oct. 16, 2001

(54) ADAPTIVE OUTPUT INFLATOR

(75) Inventors: G. Dean Mossi, Roy; Kim V. Dahl, Clinton, both of UT (US)

(73) Assignee: Autoliv ASP, Inc., Ogden, UT (US)

Reexamination Request:
No. 90/005,861, Nov. 20, 2000

Reexamination Certificate for:
Patent No.: 6,032,979
Issued: Mar. 7, 2000
Appl. No.: 09/027,114
Filed: Feb. 18, 1998

(51) Int. Cl.⁷ .................................................... B60R 21/26
(52) U.S. Cl. .......................... 280/741; 280/736; 280/742
(58) Field of Search ......................................... 280/741, 731, 280/735, 736, 742, 734

(56) References Cited

U.S. PATENT DOCUMENTS

| 3,972,545 | 8/1976 | Kirchoff et al. . |
| 5,320,382 | 6/1994 | Goldstein et al. . |
| 5,553,889 | 9/1996 | Hamilton et al. . |
| 5,564,743 | 10/1996 | Marchant . |
| 5,839,754 | 11/1998 | Schlüter et al. . |

FOREIGN PATENT DOCUMENTS

| 19520847A1 | 12/1996 | (DE) . |
| 5319199 | 12/1993 | (JP) . |

OTHER PUBLICATIONS

Stephan Schlott, "Airbag Die zündende Idee beim Insassenschutz (The Explovive Idea in Vehicle Occupant Protection)," The Library of Technology vol. 121, 1996. (Translation Included).

*Primary Examiner*—Paul Dickson

(57) ABSTRACT

An airbag inflator which can supply airbag inflation gas in an adaptive output is provided. The subject inflator includes two discrete isolated chambers of gas generant materials and permits several distinct inflation performance scenarios while desirably employing a single set of inflation gas treatment components such as filters for the treatment of products of both chambers.

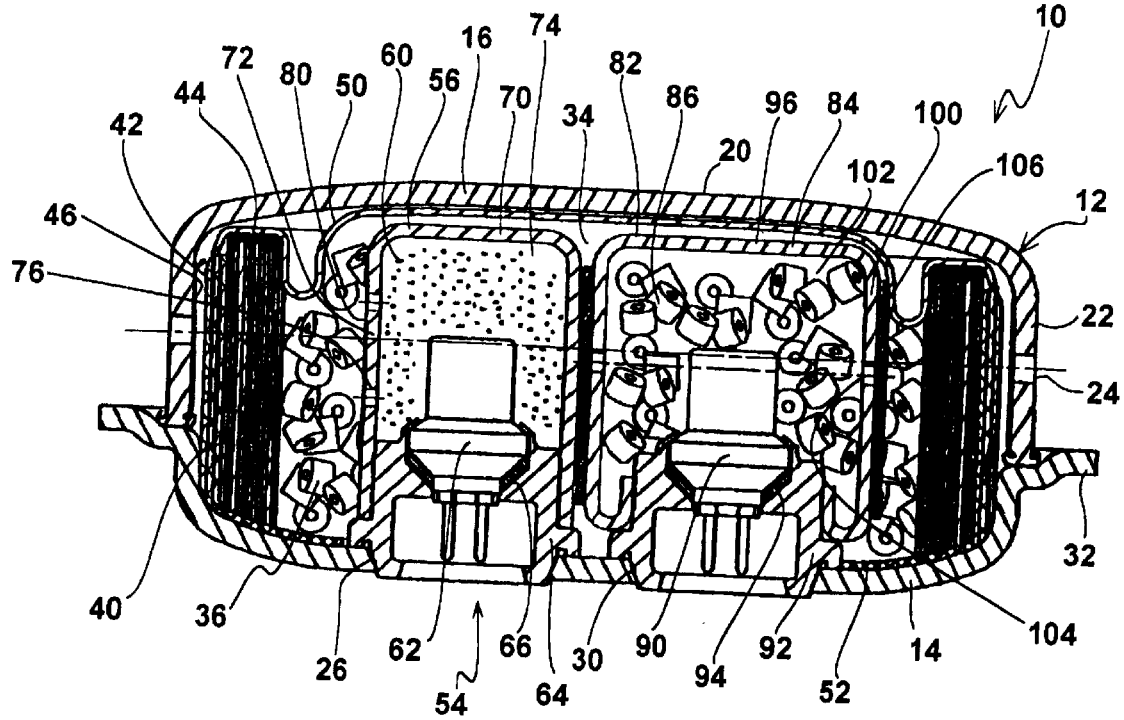

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–19 is confirmed.

* * * * *